W. FLOOD.
SECTIONAL RIM FOR PNEUMATIC TIRES.
APPLICATION FILED MAY 3, 1919.
1,417,724. Patented May 30, 1922.
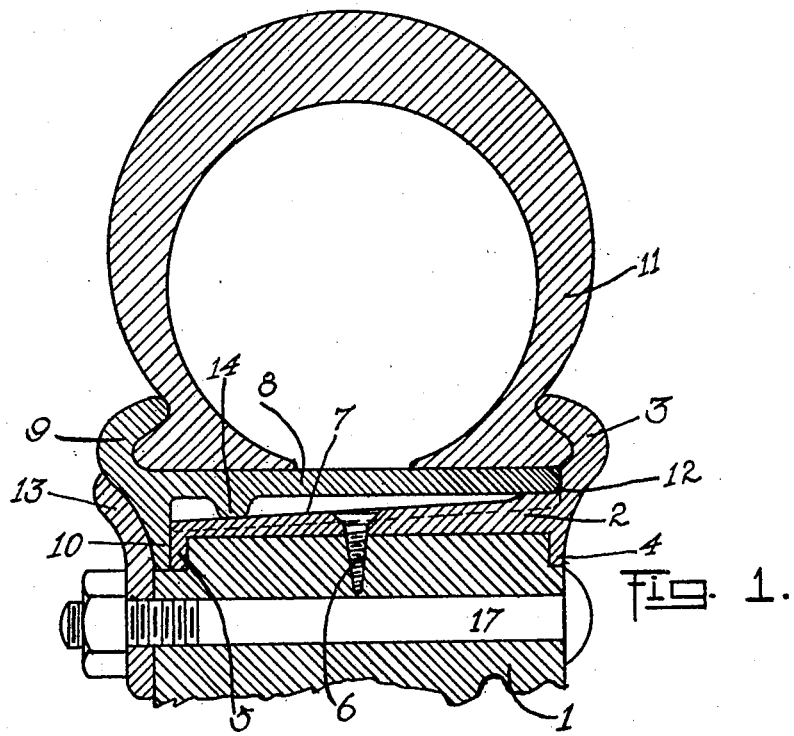
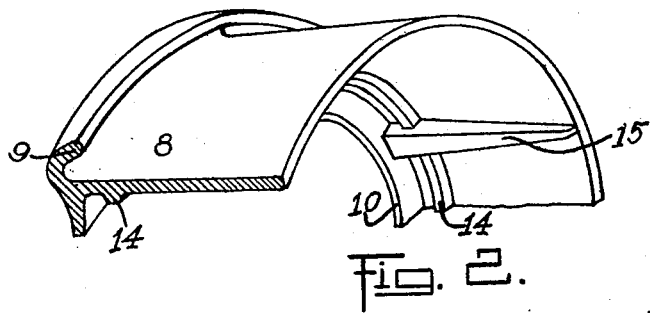
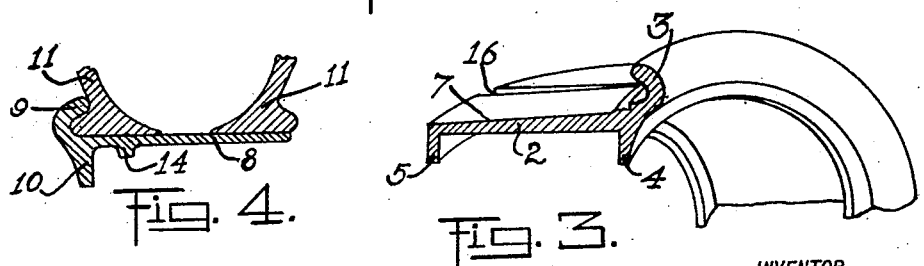
WITNESS:
Gordon Reish
INVENTOR
WILLIAM FLOOD
BY
Charles E. Viner
ATTORNEY

UNITED STATES PATENT OFFICE.

WILLIAM FLOOD, OF DETROIT, MICHIGAN, ASSIGNOR OF ONE-HALF TO ROBERT VICKERS, OF DETROIT, MICHIGAN.

SECTIONAL RIM FOR PNEUMATIC TIRES.

1,417,724.  Specification of Letters Patent.  Patented May 30, 1922.

Application filed May 3, 1919. Serial No. 294,363.

*To all whom it may concern:*

Be it known that I, WILLIAM FLOOD, a citizen of the United States, residing at Detroit, county of Wayne, State of Michigan, have invented a certain new and useful Improvement in Sectional Rims for Pneumatic Tires, and declare the following to be a full, clear, and exact description of the same, such as will enable others skilled in the art to which it pertains to make and use the same, reference being had to the accompanying drawings, which form a part of this specification.

This invention relates to sectional rims for wheels of automobiles and the like and the object of the invention is to provide a two part rim, one part being detachably mounted on the wheel and carrying the usual inflatable tire and casing therefor from which demountable portion the tire and casing are readily removable. The commonly used demountable rim is provided with a tire carrying flange on opposite sides and in order to demount the tire the rim is split and adapted to be contracted to reduce the diameter thereof and permit removal of the tire. The operation, however, is difficult for the usual inexperienced person, and this invention seeks to provide a removable rim member from which the tire and case may be removed with a minimum amount of labor. To this end the invention involves the novel features of construction as is hereinafter more fully described in which a felloe rim member is provided in fixed relation with the wheel and on which an inner tire engaging flange is formed and a demountable rim member also having a tire engaging flange for the opposite side of the casing and provided with a ring like portion on which the tire seats, the said removable rim portion and tire mounted thereon being adapted to be attached to or detached from the fixed rim member on the felloe. The construction further involves the means for preventing a creeping of the removable member on the fixed member of the two-part rim. These and other objects and the several novel features of the invention and the preferred form of construction thereof is shown in the accompanying drawings in which—

Fig. 1 is a cross section of a portion of the tire and felloe of the wheel showing my improved rim construction.

Fig. 2 is a detail in perspective of a portion of the detachable rim member.

Fig. 3 is a detail in perspective of the fixed rim member.

Fig. 4 is a detail in cross section showing a part of the tire seated on the detachable rim member.

The general construction of the rim is clearly shown in cross section in Fig. 1 in which part of the felloe of the wheel only is shown at 1 and on this felloe is provided a fixed member 2 of the two-part rim having a tire engaging flange 3 on one side and being provided with the inwardly extending circumferential flanges 4 and 5 on opposite sides engaging over the edge of the felloe. These flanges 4 and 5 are shown here as being set in annular recesses formed on opposite sides of the felloe respectively, but it is to be understood that these flanges may engage over the sides of the felloe on each side if desired. The part 2 of the rim may be secured to the felloe 1 by means of a screw 6 or bolts extending into or through the felloe member from the face of the rim part 2 and preferably the peripheral face 7 of the part 2 is inclined toward the outer side of the wheel as is indicated in Figs. 1 and 3. I provide also a removable rim member 8 having a tire engaging flange 9 on the outer side and an inwardly extending flange 10 and integrally formed with which is the ring like flange 8 providing a seat for the tire and casing 11. The inner edge of this member 8 when positioned on the fixed member 2 engages an annular recess 12 in the said fixed rim member 2. The removable flange is held in position by a series of clips 13, the upper end of which engages beneath the tire engaging flange 9 and against the annular flange 10, there being a number of these clips 13 equidistantly positioned about the wheel and secured in place by bolts 17 extending through the felloe. By removing the clips 13, the flange 8 carrying the tire may be removed from the fixed rim and, as the inner side of the rim member 8 is unprovided with a flange the tire may be readily removed from that side as will be readily understood. The removable portion 8 is readily taken from the fixed member by reason of the slope of the said fixed member as hereinafter mentioned which enables the demountable member to be readily inserted over the fixed member and forced to final position.

To prevent the removable member from rusting in place the inner face of the demountable member is spaced from the outer or sloping face of the fixed member and this is accomplished by positioning the annular notch or recess 12 slightly above the outer face of the fixed member as shown and further, by providing at the outer edge an annular rib 14 on the inner face of the removable member and thus the removable member is supported at two points on the fixed member—namely, by the rib 14 near the flange side of the removable member and at the inner edge by the notch provided in the fixed member and thus the two parts do not become rusted together in use.

It is further desirable that the outer removable rim member be prevented from creeping on the fixed rim member and for this purpose I have provided the outer rim member with a tapered lug 15 extending transversely thereof as will be readily understood from Fig. 2 and this lug fits the transverse groove 16 formed in the fixed member. The lug 15 is here shown as extending the entire width of the removable member. The length of the lug 15 and groove 16 therefor is not material as the only requirement is that the same shall be of such character as to withstand the strains incident to the use of the wheel.

By providing one or more such lugs and grooves, the possibility of movement of the demountable rim member circumferentially of the fixed rim member is prevented. In the construction here shown the flange 10 of the demountable rim member and flange 5 of the fixed member seat in the annular recess of the felloe and the point of connection with the felloe is flush with the side thereof which is the preferred form of construction. As heretofore stated, however, these depending flanges of the two rim parts may extend over the sides of the felloe if so desired.

By providing a rim for the wheel having a fixed and a removable portion each having a flange for securing the tire, and the removable rim member providing a seat for the tire, the said removable rim member with the tire thereon may be readily detached from the wheel and the tire slipped off from that side of the said rim member unprovided with a flange. The several objects of the invention are thus secured by the construction shown.

Having thus briefly described my invention, what I claim is—

1. The combination with a wheel and an inflatable tire therefor, of a two part rim, one part being in fixed relation with the wheel and the other part being removable and engaging over and supported in spaced relation with the fixed part, said fixed part having a tire engaging flange on one side and the peripheral face thereof being formed at an angle to the axis and sloping away from the flange, the removable part having a tire engaging flange on the outer side complemental to the flange of the fixed part and the opposite edge seating adjacent the flange of the fixed part, said removable part having an inner circumferential rib near its flange, said seat and rib maintaining the two rim parts in spaced relation, and detachable means for holding the removable part in position on the said fixed part.

2. The combination with a wheel and inflatable tire therefor, of a two part rim, one part having an internal flange at each side to engage over the felloe of the wheel and having an outwardly extending peripheral tire engaging flange on one side, an outer removable rim member adapted to be placed over the said fixed member, the said removable member having a tire engaging flange on the outer side only and having a peripheral rib on the inner face seating on the outer face of the fixed part of the rim, said fixed part having a seat for the inner edge of the said removable part, said rib and seat maintaining the outer rim member in spaced relation with the fixed rim member, said fixed rim member also having a transverse groove and said removable rim member having a transverse lug fitting therein preventing circumferential displacement of the removable part when assembled with the fixed part, a series of flange retaining clips adapted to engage against the outer flanged side of the removable rim member, and bolts extending through the felloe of the wheel for retaining the clips.

In testimony whereof, I sign this specification.

WILLIAM FLOOD.